United States Patent
Saito et al.

(10) Patent No.: US 11,630,425 B2
(45) Date of Patent: Apr. 18, 2023

(54) SERVO CONTROL DEVICE

(71) Applicant: Mitsubishi Electric Corporation, Tokyo (JP)

(72) Inventors: Akio Saito, Tokyo (JP); Hidetoshi Ikeda, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 514 days.

(21) Appl. No.: 16/638,804

(22) PCT Filed: Sep. 8, 2017

(86) PCT No.: PCT/JP2017/032552
§ 371 (c)(1),
(2) Date: Feb. 13, 2020

(87) PCT Pub. No.: WO2019/049328
PCT Pub. Date: Mar. 14, 2019

(65) Prior Publication Data
US 2020/0192303 A1    Jun. 18, 2020

(51) Int. Cl.
*G05B 19/19*    (2006.01)
*G05B 11/36*    (2006.01)
*B25J 9/16*    (2006.01)

(52) U.S. Cl.
CPC .......... *G05B 11/36* (2013.01); *B25J 9/1651* (2013.01); *B25J 9/1664* (2013.01); *G05B 19/19* (2013.01);
(Continued)

(58) Field of Classification Search
CPC .......... G05B 2219/39241; G05B 2219/41199; G05B 2219/41428; G05B 2219/42077;
(Continued)

(56) References Cited

U.S. PATENT DOCUMENTS

| 4,951,191 A | 8/1990 | Hiroi et al. |
| 5,216,342 A * | 6/1993 | Torii .................... G05B 19/19 |
| | | 318/609 |

(Continued)

FOREIGN PATENT DOCUMENTS

| DE | 3889014 T2 | 7/1994 |
| DE | 69030289 T2 | 9/1997 |

(Continued)

OTHER PUBLICATIONS

International Search Report and Written Opinion dated Nov. 28, 2017 for PCT/JP2017/032552 filed on Sep. 8, 2017, 8 pages including English Translation of the International Search Report.
(Continued)

*Primary Examiner* — Rina I Duda
(74) *Attorney, Agent, or Firm* — Xsensus LLP

(57) ABSTRACT

A servo control device for controlling an end effector of a machine to follow a set reference trajectory by driving the machine using an actuator includes a feedforward compensation unit that performs feedforward compensation by outputting a feedforward signal for controlling the actuator on the basis of a position command signal inputted thereto, wherein input-output characteristics represented in a continuous-time system of the feedforward compensation unit are expressed by a transfer function having unstable zeros, and a step response of the feedforward compensation unit has an initial undershoot.

8 Claims, 9 Drawing Sheets

(52) U.S. Cl.
CPC ............. *G05B 2219/39241* (2013.01); *G05B 2219/41199* (2013.01); *G05B 2219/41428* (2013.01)

(58) Field of Classification Search
CPC ........ G05B 11/36; G05B 19/19; B25J 9/1651; B25J 9/1664
See application file for complete search history.

(56) References Cited

U.S. PATENT DOCUMENTS

| | | | |
|---|---|---|---|
| 6,922,606 B1 | 7/2005 | Yutkowitz | |
| 6,943,522 B2* | 9/2005 | Nagaoka | G05B 19/19 318/632 |
| 7,130,718 B2 | 10/2006 | Gunnarsson et al. | |
| 7,741,806 B2* | 6/2010 | Kuhlmann | H02J 7/0042 439/38 |
| 7,750,592 B2 | 7/2010 | Eguchi | |
| 8,184,325 B2* | 5/2012 | Phillips | H04L 12/66 358/1.15 |
| 8,271,134 B2* | 9/2012 | Kato | B25J 9/163 700/253 |
| 8,928,267 B2* | 1/2015 | Igarashi | G05B 19/416 318/632 |
| 2001/0006438 A1 | 7/2001 | Nakagawa et al. | |
| 2004/0093119 A1 | 5/2004 | Gunnarsson et al. | |
| 2008/0169778 A1 | 7/2008 | Eguchi | |
| 2013/0234642 A1* | 9/2013 | Igarashi | H02P 23/0004 318/611 |
| 2017/0146971 A1 | 5/2017 | Ono et al. | |

FOREIGN PATENT DOCUMENTS

| | | |
|---|---|---|
| DE | 60129009 T2 | 3/2008 |
| DE | 102008003051 A1 | 7/2008 |
| DE | 60038578 T2 | 8/2008 |
| EP | 0412853 A2 | 2/1991 |
| JP | 2001-249702 A | 9/2001 |
| JP | 2006-015431 A | 1/2006 |

OTHER PUBLICATIONS

Sugie, T., et al. "Introduction to Feedback Control," Corona Publishing Co., Ltd., Tokyo, Japan, 1999, pp. 98-99, (with English Translation of the relevant part—p. 99).

Office Action dated Apr. 7, 2021, in corresponding German patent Application No. 11 2017 008 009.6, 14 pages.

* cited by examiner

SERVO CONTROL DEVICE ACCORDING TO COMPARATIVE EXAMPLE

SERVO CONTROL DEVICE ACCORDING TO FIRST EMBODIMENT

SERVO CONTROL DEVICE

CROSS-REFERENCE TO RELATED APPLICATIONS

The present application is based on PCT filing PCT/JP2017/032552, filed Sep. 8, 2017, the entire contents of which are incorporated herein by reference.

FIELD

The present invention relates to a servo control device that controls an end effector of a machine to be controlled to follow a set reference trajectory.

BACKGROUND

In an industrial machine such as a robot arm that performs a job such as machining, assembly, sealing, or welding, a servo control device controls a servomotor set on each of drive axes such as joint axes of the machine so that the position of an end effector of the machine follows a preset reference trajectory. During this control, since the moving velocity in a direction of each axis or the rotating velocity about each axis changes sharply at a corner portion of the reference trajectory, it is likely to cause vibration in the machine.

For this situation, in typical servo control, in order to suppress the machine vibration, such control as suppressing a change in command position is performed by locally smoothing a command signal with respect to each axis on a time basis using a filter, but as a result of the control, a trajectory error such as an inward turning error caused by the fact that a response trajectory of the end effector deviates from a reference trajectory.

Then, a control method for minimizing the trajectory error has been proposed in recent years. In Patent Literature 1 listed below teaches that, for control of an end effector position of a robot, an end effector position of the robot after a predetermined sampling time is estimated by modeling, and a command position is corrected using a vector perpendicular to a reference trajectory and extending from the estimated end effector position as a correction value. In this manner, control is performed such that the end effector position follows the reference trajectory while a time delay is permitted.

In the method disclosed in Patent Literature 1, it is necessary to perform computation for obtaining a perpendicular from the estimated end effector position of the robot to the reference trajectory. In a case of a command shape of a reference trajectory whose moving direction changes every moment, however, a plurality of perpendiculars to the reference trajectory may be present depending on the relation between the reference trajectory and the response trajectory, which causes a problem in that the correction amount cannot be uniquely determined. Assume a case where two sides are at a predetermined angle to each other, such as a case of a corner portion when a command shape is a rectangle, as a specific example. In this case, when the estimated value of the end effector position is on a bisector of an angle with the above-mentioned predetermined angle, a foot of a perpendicular is present on each of the two sides, and so this means that the correction amount cannot be uniquely determined. In addition, in a case where the direction or length of a perpendicular changes suddenly, the correction amount changes sharply, thereby leading to a problem in that a shock is given to the machine and vibration is caused.

CITATION LIST

Patent Literature

Patent Literature 1: Japanese Patent Application Laid-open No. 2006-15431

SUMMARY

Technical Problem

In order to reduce a trajectory error between a response trajectory and a reference trajectory of a point of operation that is an end effector of a machine while minimizing vibration occurring in the machine as described above, it is desirable that the gain characteristic and the phase characteristic of feedforward compensation in the servo control device be designed independently in their respective ways.

The present invention has been made in view of the above circumstances, and an object thereof is to provide a servo control device allowing the gain characteristic and the phase characteristic of feedforward compensation to be designed independently in their respective ways.

Solution to Problem

In order to solve the aforementioned problems and achieve the object, the present invention provides a servo control device for controlling an end effector of a machine to follow a set reference trajectory by driving the machine using an actuator, the servo control device comprising: a feedforward compensation unit to perform feedforward compensation by outputting a feedforward signal for controlling the actuator on the basis of a position command signal inputted therein, wherein input-output characteristics represented in a continuous-time system of the feedforward compensation unit are expressed by a transfer function having unstable zeros, and a step response of the feedforward compensation unit has an initial undershoot.

Advantageous Effects of Invention

According to the present invention, there is exerted an advantageous effect of achieving a servo control device allowing the gain characteristic and the phase characteristic for feedforward compensation to be designed independently in their respective ways.

DESCRIPTION OF EMBODIMENTS

A servo control device according to embodiments of the present invention will be described in detail below with reference to the drawings. Note that the present invention is not necessarily limited by these embodiments.

First Embodiment

Figure 1:
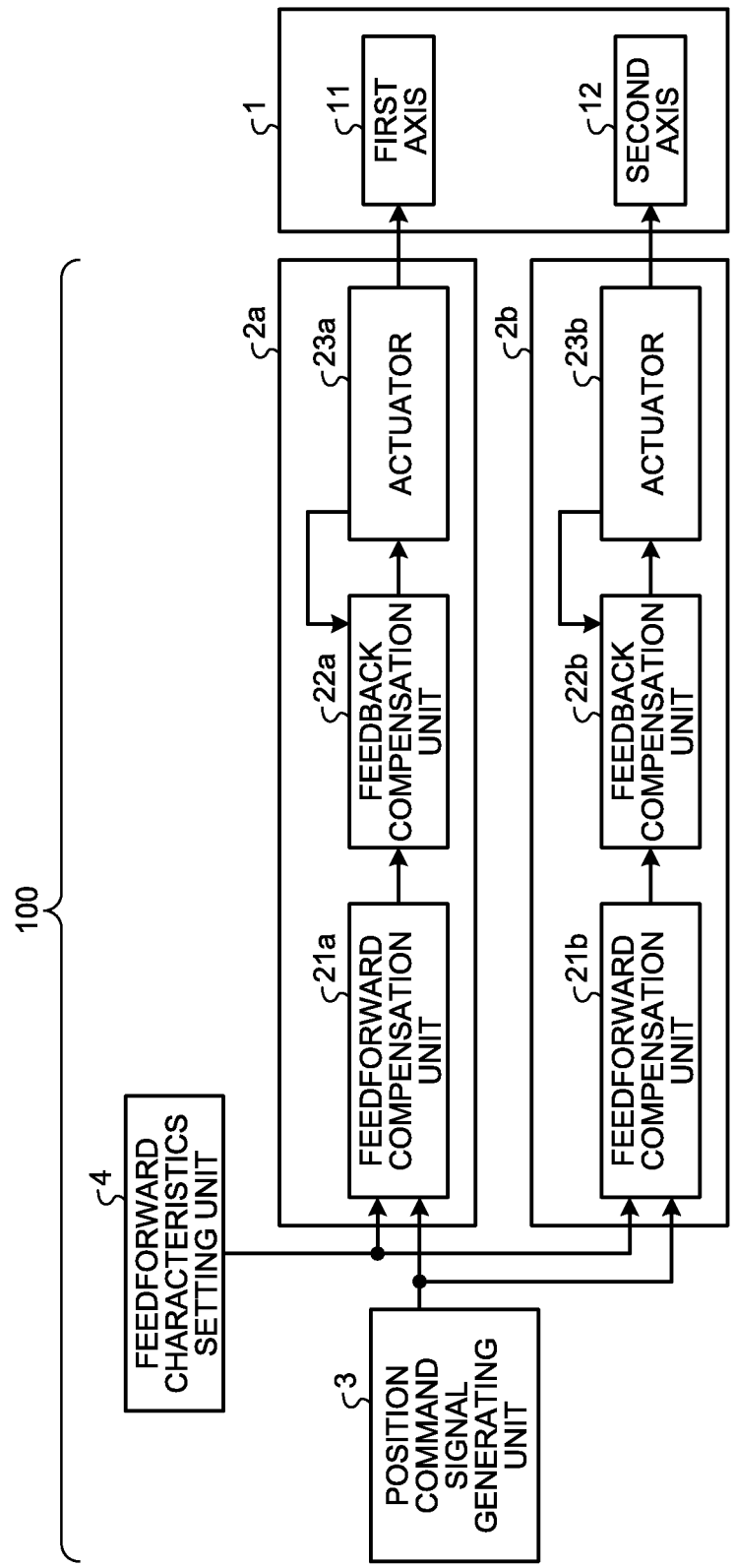
FIG. 1 is a block diagram illustrating a schematic configuration of a servo control device according to a first embodiment of the present invention.

FIG. 1 is a block diagram illustrating a schematic configuration of a servo control device 100 according to a first embodiment of the present invention. The servo control device 100 recognizes a machine having one or more drive axes as a controlled object, and performs trajectory tracking control for an end effector of the machine to be controlled to follow a set reference trajectory with high accuracy. A machine to be controlled by the servo control device 100 is a horizontal articulated robot 1 in this example. The servo control device 100 includes a first axis servo control unit 2a, a second axis servo control unit 2b, a position command signal generating unit 3, and a feedforward characteristics setting unit 4. The first axis servo control unit 2a and the second axis servo control unit 2b drive and control the horizontal articulated robot 1.

Figure 2:
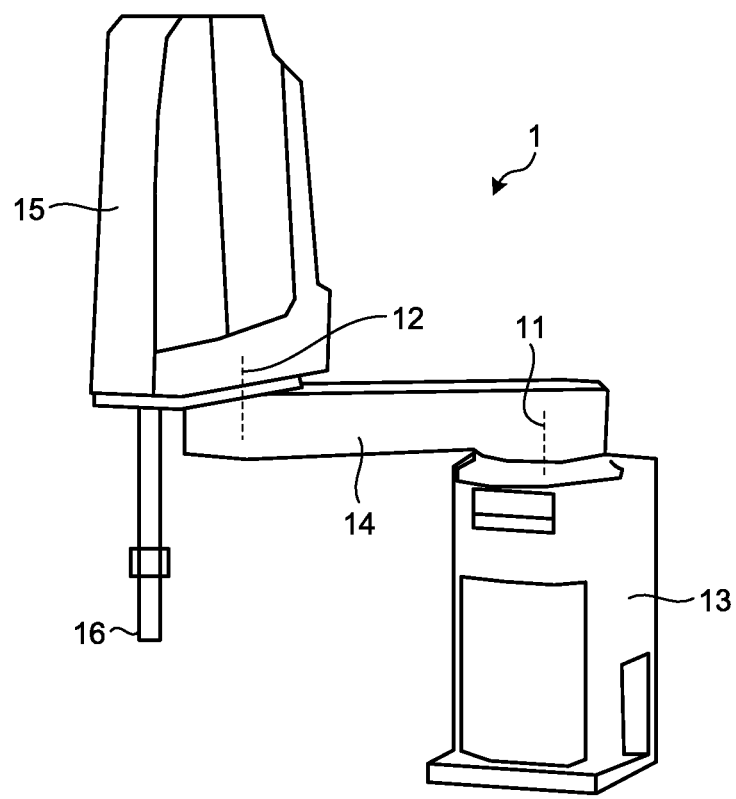
FIG. 2 is a schematic view illustrating a horizontal articulated robot according to the first embodiment.

FIG. 2 is a schematic view illustrating the horizontal articulated robot 1 according to the first embodiment. The horizontal articulated robot 1 includes: a first axis 11 and a second axis 12 that are drive axes; a base 13 fixed to an installation location and connected to the first axis 11; a first arm 14 connected to the first axis 11 and the second axis 12; a second arm 15 connected to the second axis 12, and an end effector 16 that is an end effector attached to the second arm 15.

The first axis servo control unit 2a includes a feedforward compensation unit 21a that performs feedforward compensation, a feedback compensation unit 22a that performs feedback control, and an actuator 23a that controls operation relating to the first axis 11 of the horizontal articulated robot 1. A specific example of the actuator 23a is a servomotor.

The feedforward compensation unit 21a obtains a position feedforward signal on the basis of a position command signal for the first axis 11 generated by the position command signal generating unit 3. Specifically, the feedforward compensation unit 21a obtains the position feedforward signal by shaping the position command signal on the basis of the filter characteristics of a transfer function set by the feedforward characteristics setting unit 4. Furthermore, the feedforward compensation unit 21a obtains a velocity feedforward signal and a torque feedforward signal by computation using the position feedforward signal obtained on the basis of the transfer function. The position feedforward signal, the velocity feedforward signal, and the torque feedforward signal are signals for controlling the position, the velocity, and the torque of the actuator 23a, respectively. The feedforward compensation unit 21a outputs the position feedforward signal, the velocity feedforward signal, and the torque feedforward signal as feedforward signals to the feedback compensation unit 22a.

The feedback compensation unit 22a obtains a torque command signal by performing feedback compensation on the basis of the feedforward signals inputted from the feedforward compensation unit 21a and feedback signals inputted from the actuator 23a, and outputs the torque command signal to the actuator 23a. The feedback signals inputted from the actuator 23a are a position feedback signal, a velocity feedback signal, and a torque feedback signal. Thus, the feedback compensation unit 22a obtains the torque command signal by performing feedback compensation so that the position feedback signal and the velocity feedback signal from the actuator 23a follow the position feedforward signal and the velocity feedforward signal, respectively.

The position and the velocity of the actuator 23a are controlled on the basis of the torque command signal inputted from the feedback compensation unit 22a.

The second axis servo control unit 2b has a configuration equal to that of the first axis servo control unit 2a, and includes: a feedforward compensation unit 21b that performs feedforward compensation; a feedback compensation unit 22b that performs feedback control; and an actuator 23b that controls operation relating to the second axis 12 of the horizontal articulated robot 1. A specific example of the actuator 23b is a servomotor. The operations of the feedforward compensation unit 21b, the feedback compensation unit 22b, and the actuator 23b are similar to those of the feedforward compensation unit 21a, the feedback compensation unit 22a, and the actuator 23a, respectively, described above.

The actuator 23a is mounted on the first axis 11, and the actuator 23b is mounted on the second axis 12. With relying on this configuration, the actuators 23a and 23b drives the horizontal articulated robot 1 that is a machine to be controlled, for the end effector 16 to be controlled to follow a set reference trajectory. Because an actuator is needed for each of drive axes of the machine to be controlled, two or more actuators are needed for two or more drive axes, the number of actuators corresponding to that of the drive axes.

In FIG. 2, illustration of the servo control device 100, and also the actuators 23a and 23b is omitted. The actuator 23a drives the first arm 14 through the first axis 11, and the actuator 23b drives the second arm 15 through the second axis 12, and thereby the position of the end effector 16 is controlled.

Although a third axis for controlling the height of the end effector 16 and a fourth axis for controlling the angle of the end effector 16 are mounted on the horizontal articulated robot 1 to be an actual product, these axes are omitted in the first embodiment for simplicity of description. In a case where the horizontal articulated robot 1 further has the third axis and the fourth axis, the servo control device 100 just has to further have a third axis servo control unit and a fourth axis servo control unit that have configurations each equal to that of the first axis servo control unit 2a or the second axis servo control unit 2b, for the third axis and the fourth axis, respectively.

The position command signal generating unit 3 computes and outputs a position command signal for each of the first axis 11 and the second axis 12 of the horizontal articulated robot 1 for the end effector 16 to follow the reference trajectory in accordance with an operation program created in advance.

The feedforward characteristics setting unit 4 sets a transfer function that determines the filter characteristics of each of the feedforward compensation unit 21a and the feedforward compensation unit 21b. The transfer function of the feedforward compensation unit 21a represents input-output characteristics in which the position command signal for the first axis 11 is an input and a position feedforward signal for the actuator 23a is an output. The transfer function of the feedforward compensation unit 21b represents input-output characteristics in which the position command signal for the second axis 12 is an input and a position feedforward signal for the actuator 23b is an output.

Note that each of the transfer functions that are represented in a continuous-time system for the feedforward compensation unit 21a and the feedforward compensation unit 21b is set to have unstable zeros by the feedforward characteristics setting unit 4. An unstable zero refers to a zero with a positive real part. Because the transfer function has unstable zeros, an initial undershoot occurs in a step response of each of the feedforward compensation unit 21a and the feedforward compensation unit 21b. Note that an initial undershoot refers to a situation in which the step response has a value with a sign opposite to that of a steady-state value before the step response reaches the steady-state value. Note that a system expressed by a transfer function having unstable zeros is called a non-minimum-phase system, and a system expressed by a transfer function that is stable bus has no unstable zero is called a minimum phase system.

A transfer function in which the order of a numerator polynomial is a first order and the order of a denominator polynomial is a fifth order is expressed by the following formula (1) as an example of the transfer function that is represented in a continuous-time system, which has unstable zeros set for the feedforward compensation unit 21a and the feedforward compensation unit 21b.

[Formula 1]

$$F(s) = \frac{1 - b_1\left(\frac{s}{\omega_0}\right)}{1 + a_1\left(\frac{s}{\omega_0}\right) + a_2\left(\frac{s}{\omega_0}\right)^2 + a_3\left(\frac{s}{\omega_0}\right)^3 - a_4\left(\frac{s}{\omega_0}\right)^4 + \left(\frac{s}{\omega_0}\right)^5} \quad (1)$$

The zero of the transfer function expressed by formula (1) is at $(\omega_0/b_1)$, and if $\omega_0$ and $b_1$ are positive real numbers, $(\omega_0/b_1)$ is a positive real number, and thus unstable zeros. The system expressed by the transfer function of formula (1) is therefore a non-minimum-phase system.

The feedforward characteristics setting unit 4 calculates a gain $G(\omega)$ and a phase delay $PD(\omega)$ at an angular frequency $\omega$ of the transfer function of formula (1) on the basis of formula (2) and formula (3), respectively, below. Note that the phase delay is an amount obtained by multiplying the phase of the transfer function by the inverse of the angular frequency $\omega$ and inverting the sign of the multiplication result, which is an amount of delay time into which a phase difference between the input and the output of the transfer function is converted.

[Formula 2]

$$G(\omega) = \sqrt{\frac{1 + \left(b_1\left(\frac{\omega}{\omega_0}\right)\right)^2}{\left(1 - a_2\left(\frac{\omega}{\omega_0}\right)^2 + a_4\left(\frac{\omega}{\omega_0}\right)^4\right)^2 + \left(a_1\left(\frac{\omega}{\omega_0}\right) - a_3\left(\frac{\omega}{\omega_0}\right)^3 + \left(\frac{\omega}{\omega_0}\right)^5\right)^2}} \quad (2)$$

[Formula 3]

$$PD(\omega) = \frac{1}{\omega}\left[\arctan\left(b_1\left(\frac{\omega}{\omega_0}\right)\right) + \arctan\left(\frac{a_1\left(\frac{\omega}{\omega_0}\right) - a_3\left(\frac{\omega}{\omega_0}\right)^3 + \left(\frac{\omega}{\omega_0}\right)^5}{1 - a_2\left(\frac{\omega}{\omega_0}\right)^2 + a_4\left(\frac{\omega}{\omega_0}\right)^4}\right)\right] \quad (3)$$

The feedforward characteristics setting unit 4 further obtains power series expansion of the gain $G(\omega)$ and the phase delay $PD(\omega)$ about the angular frequency $\omega$ as in formula (4) and formula (5) shown below. Note that the last term of the right side of formula (4) represents a term in which the order of $(\omega/\omega_0)$ is a fourth or higher order, and the last term of the right side of formula (5) represents a term in which the order of $(\omega/\omega_0)$ is a tenth or higher order.

[Formula 4]

$$G(\omega) = 1 + g_1\left(\frac{\omega}{\omega_0}\right)^2 + O\left(\left(\frac{\omega}{\omega_0}\right)^4\right) \quad (4)$$

[Formula 5]

$$PD(\omega) = \frac{1}{\omega_0}\left((a_1 + b_1) + pd_2\left(\frac{\omega}{\omega_0}\right)^2 + pd_4\left(\frac{\omega}{\omega_0}\right)^4 + pd_6\left(\frac{\omega}{\omega_0}\right)^4 + pd_8\left(\frac{\omega}{\omega_0}\right)^8\right) + \\ O\left(\left(\frac{\omega}{\omega_0}\right)^{10}\right) \quad (5)$$

Here, $g_2$ that is a second-order expansion coefficient of $(\omega/\omega_0)$ of the gain $G(\omega)$ expressed by formula (4), and $pd_2$, $pd_4$, $pd_6$, and $pd_8$ that are second- to eighth-order expansion coefficients of $(\omega/\omega_0)$ of the phase delay $PD(\omega)$ expressed by formula (5) are obtained in advance as functions of $a_1$, $a_2$, $a_3$, $a_4$, and $b_1$, respectively, that are parameters of the transfer function of formula (1). In addition, the feedforward characteristics setting unit 4 obtains in advance the values of $a_1$, $a_2$, $a_3$, $a_4$, and $b_1$ such that all of $g_2$, $pd_2$, $pd_4$, $pd_6$, and $pd_8$ are zero. This problem can be formulated as a simultaneous equation expressed by the following formula (6) consisting of polynomials using $a_1$, $a_2$, $a_3$, $a_4$, and $b_1$ as variables.

[Formula 6]

$$\begin{bmatrix} g_2(a_1, a_2, a_3, a_4, b_1) \\ pd_2(a_1, a_2, a_3, a_4, b_1) \\ pd_4(a_1, a_2, a_3, a_4, b_1) \\ pd_6(a_1, a_2, a_3, a_4, b_1) \\ pd_8(a_1, a_2, a_3, a_4, b_1) \end{bmatrix} = \begin{bmatrix} 0 \\ 0 \\ 0 \\ 0 \\ 0 \end{bmatrix} \quad (6)$$

Because it is sufficient that the simultaneous equation expressed by formula (6) be solved once, the simultaneous equation may be solved offline outside the servo control device 100 to obtain the values of $a_1$, $a_2$, $a_3$, $a_4$, and $b_1$ as a solution, and the feedforward characteristics setting unit 4 may store the solution in advance.

The feedforward characteristics setting unit 4 sets the filter characteristics of the feedforward compensation units 21a and 21b by determining the values of $a_1$, $a_2$, $a_3$, $a_4$, and $b_1$ obtained as described above and a predetermined $\omega_0$ as parameters of the transfer function of formula (1).

Note that a group delay $GD(\omega)$ may be calculated instead of the phase delay $PD(\omega)$ on the basis of formula (7) shown below, and a power series expansion of the group delay GD ($\omega$) about ($\omega/\omega_0$) may be obtained as in formula (8) shown below. The said group delay corresponds to an amount obtained by differentiating the phase of a transfer function by an angular frequency $\omega$ and inverting the sign of the differentiation result. Note that the last term of the right side of formula (8) represents a term in which the order of ($\omega/\omega_0$) is a tenth or higher order.

[Formula 7]

$$GD(\omega) = \frac{d}{d\omega}\left[\arctan\left(b_1\left(\frac{\omega}{\omega_0}\right)\right) + \arctan\left(\frac{a_1\left(\frac{\omega}{\omega_0}\right) - a_3\left(\frac{\omega}{\omega_0}\right)^3 + \left(\frac{\omega}{\omega_0}\right)^5}{1 - a_2\left(\frac{\omega}{\omega_0}\right)^2 + a_4\left(\frac{\omega}{\omega_0}\right)^4}\right)\right] \quad (7)$$

[Formula 8]

$$GD(\omega) = \frac{1}{\omega_0}\left((a_1 + b_1) - gd_2\left(\frac{\omega}{\omega_0}\right)^2 + gd_4\left(\frac{\omega}{\omega_0}\right)^4 + gd_6\left(\frac{\omega}{\omega_0}\right)^4 + gd_8\left(\frac{\omega}{\omega_0}\right)^8\right) + O\left(\left(\frac{\omega}{\omega_0}\right)^{10}\right) \quad (8)$$

Then, $g_2$ that is a second-order expansion coefficient of ($\omega/\omega_0$) of the gain $G(\omega)$ expressed by formula (4), and $gd_2$, $gd_4$, $gd_6$, and $gd_8$ that are second- to eighth-order expansion coefficients of ($\omega/\omega_0$) of the group delay $GD(\omega)$ expressed by formula (8) are obtained as functions of $a_1$, $a_2$, $a_3$, $a_4$, and $b_1$, respectively, that are parameters of the transfer function of formula (1). The values of $a_1$, $a_2$, $a_3$, $a_4$, and $b_1$ may then be determined such that all of $g_2$, $gd_2$, $gd_4$, $gd_6$, and $gd_8$ are zero. Because the difference between the expansion coefficient of a power series expansion of the phase delay $PD(\omega)$ and that of the group delay $GD(\omega)$ is only a difference of a constant multiple, $gd_2$, $gd_4$, $gd_6$, and $gd_8$ being all zero can result in the same as the fact that $pd_2$, $pd_4$, $pd_6$, and $pd_8$ are all zero.

Figure 3:
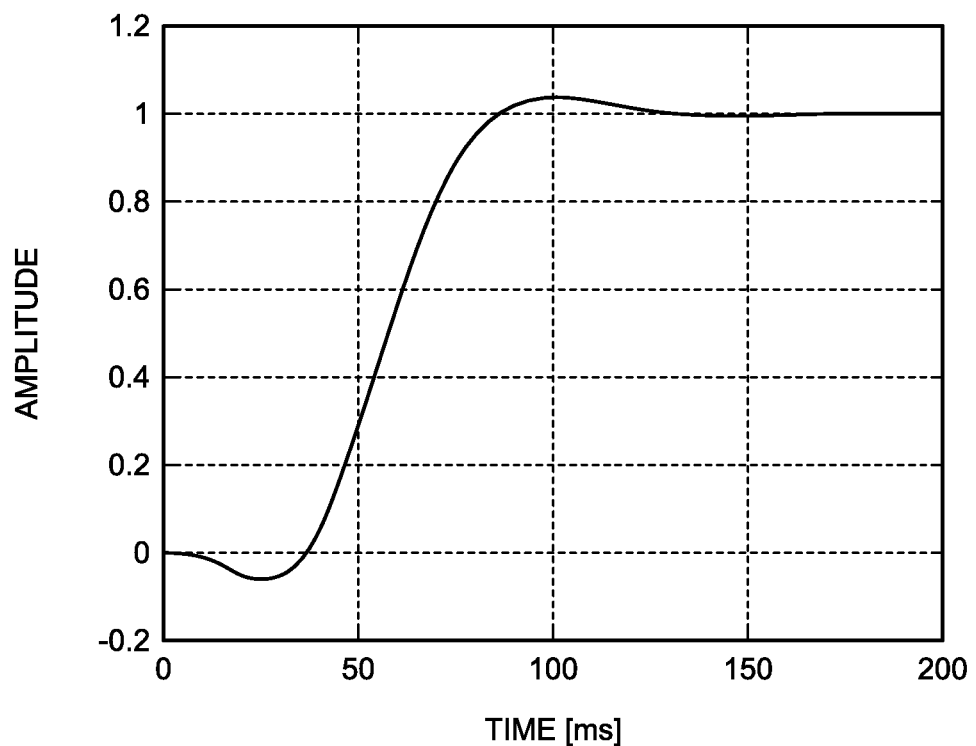
FIG. 3 is a graph illustrating a step response of a transfer function of a feedforward compensation unit according to the first embodiment.

FIG. 3 is a graph illustrating a step response of a transfer function of the feedforward compensation units 21a and 21b according to the first embodiment. In other words, FIG. 3 illustrates a step response of a transfer function of a system that outputs a position feedforward signal on the basis of a position command signal. In FIG. 3, the horizontal axis represents time, and the vertical axis represents amplitude. Because the transfer function has unstable zeros, the step response of the feedforward compensation units 21a and 21b according to the first embodiment has an initial undershoot as illustrated in FIG. 3.

Next, an operation required of a servo control system will be explained. Regarding an error of a response position with respect to a command position in a servo control system, a component of the error in the tangential direction of the reference trajectory will be referred to as a tracking error and a component thereof in the direction perpendicular to the tangential direction will be referred to as a trajectory error. Because the presence of a trajectory error results in mismatch between a machining shape and a reference shape, it is required that a trajectory error be avoided as much as possible. In contrast, because a tracking error does not directly affect a machining shape, a tracking error is often permitted as compared to a trajectory error. In addition, in control of an object having a mechanism component with low rigidity such as a speed reducer of a robot, a smooth response needs to be achieved by attenuating high-frequency components included in a command using a filter, so as to suppress machine vibration.

In the servo control device 100 according to the first embodiment, the feedforward characteristics setting unit 4 determines the values of the parameters $a_1$, $a_2$, $a_3$, $a_4$, and $b_1$ of formula (1) so that expansion coefficients $g_2$, $pd_2$, $pd_4$, $pd_6$, and $pd_8$ of formula (4) and formula (5), which are power series expansion of the gain $G(\omega)$ and the phase delay $PD(\omega)$, are all zero. As a result, frequency responses of the gain $G(\omega)$ and the phase delay $PD(\omega)$ of the transfer function of formula (1) are expressed by the following formula (9).

[Formula 9]

$$\begin{cases} G(\omega) = 1 + O\left(\left(\frac{\omega}{\omega_0}\right)^4\right) \\ PD(\omega) = \frac{a_1 + b_1}{\omega_0} + O\left(\left(\frac{\omega}{\omega_0}\right)^{10}\right) \end{cases} \quad (9)$$

In formula (9), high-order terms in which the order of ($\omega/\omega_0$) is a fourth or higher order are negligible in a frequency band in which ($\omega/\omega_0$)<<1 is satisfied. Thus, the frequency responses of the gain $G(\omega)$ and the phase delay $PD(\omega)$ in a frequency band in which ($\omega/\omega_0$)<<1 is satisfied are expressed by the following formula (10).

[Formula 10]

$$\begin{cases} G(\omega) \approx 1 \\ PD(\omega) \approx \frac{a_1 + b_1}{\omega_0} \end{cases} \quad (10)$$

Formula (10) means that the transfer function of formula (1) can be deemed to have a constant gain of 1 and a constant delay time of $(a_1+b_1)/\omega_0$ in a frequency band in which ($\omega/\omega_0$)<<1 is satisfied. In other words, formula (10) means that a system expressed by the transfer function of formula (1) can be deemed to be a dead time component with a delay time of $(a_1+b_1)/\omega_0$ in a frequency range in which $(\omega/\omega_0)\ll 1$ is satisfied.

In a dead time component, a waveform equal to an input waveform is outputted after a lapse of a dead time. Thus, when the feedforward compensation units 21*a* and 21*b* have dead time characteristics, a tracking error for a delay time occurs but a trajectory error becomes very small in a frequency band in which $(\omega/\omega_0)\ll 1$ is satisfied.

In contrast, in a frequency band in which $(\omega/\omega_0)\gg 1$ is satisfied, terms other than a term in which the order of $(\omega/\omega_0)$ is the highest are negligible, and so the gain $G(\omega)$ of the transfer function of formula (1) is expressed by the following formula (11).

[Formula 11]

$$G(\omega) \simeq \frac{b_1}{\left(\dfrac{\omega}{\omega_0}\right)^4} \qquad (11)$$

The order of the denominator of the gain $G(\omega)$ expressed by formula (11) is a four order. Therefore, because the gain $G(\omega)$ is attenuated at −80 dB/dec, a high-frequency component included in a position command signal is removed to make it possible to achieve a smooth response.

Next, comparison between the servo control device 100 of the first embodiment and a servo control device of a comparative example will be described. In a case where the order of a transfer function for feedforward compensation in the servo control device of the comparative example is a fourth order, this transfer function is expressed by the following formula (12).

[Formula 12]

$$F'(s) = \frac{1}{1 + a'_1\left(\dfrac{s}{\omega_0}\right) + a'_2\left(\dfrac{s}{\omega_0}\right)^2 + a'_3\left(\dfrac{s}{\omega_0}\right)^3 + a'_4\left(\dfrac{s}{\omega_0}\right)^4} \qquad (12)$$

In the servo control device of the comparative example, parameters $a_1'$, $a_2'$, $a_3'$, and $a_4'$ for feedforward compensation based on formula (12) are determined by the know-how of a designer in view of the rise time and the settling time of the step response.

Figure 4:
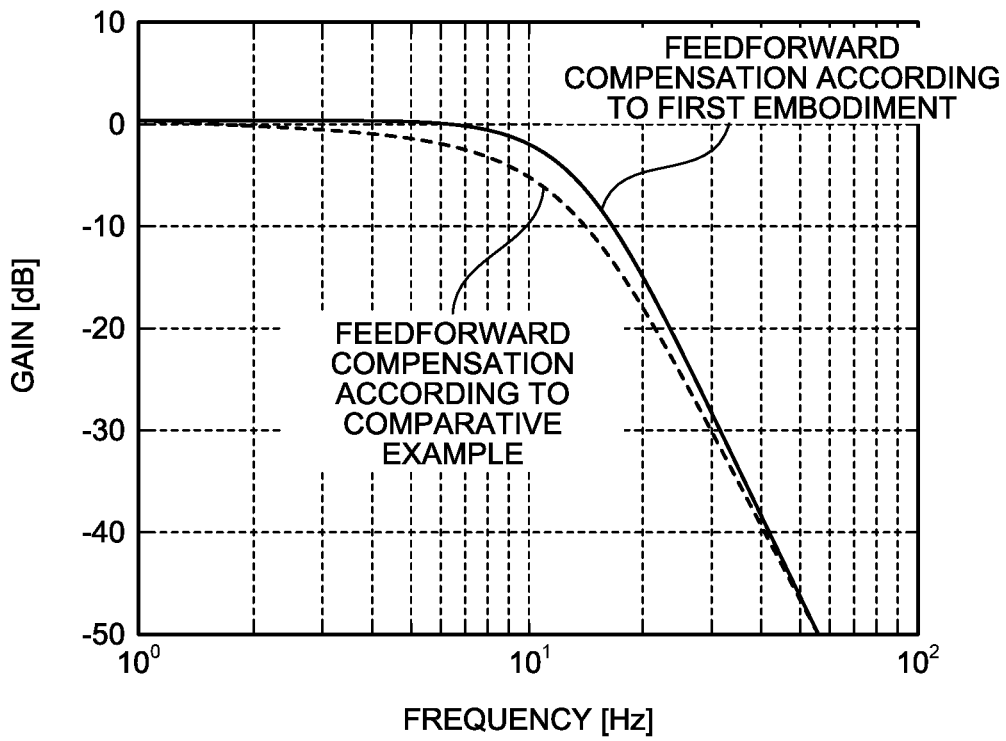
FIG. 4 is a graph used to compare a frequency response of gain of feedforward compensation of the servo control device according to the first embodiment with that according to a comparative example.
Figure 5:
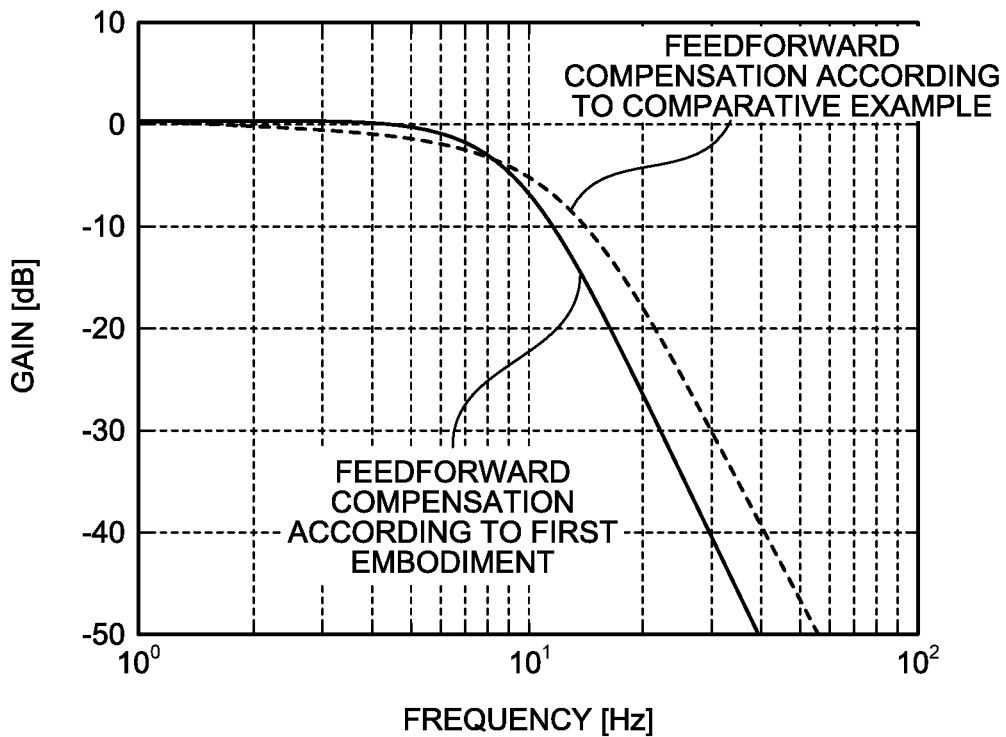
FIG. 5 is another graph used to compare a frequency response of gain of feedforward compensation of the servo control device according to the first embodiment with that according to the comparative example.

FIG. 4 is a graph used to compare a frequency response of the gain of feedforward compensation of the servo control device according to the first embodiment with that according to the comparative example. FIG. 5 is another graph used to compare a frequency response of the gain of feedforward compensation of the servo control device according to the first embodiment with that according to the comparative example. In FIGS. 4 and 5, the horizontal axis represents frequency and the vertical axis represents gain. The feedforward compensation of the servo control device 100 according to the first embodiment is illustrated by a solid line, and that of the servo control device according to the comparative example is illustrated by a broken line. The feedforward compensation performed by the feedforward compensation units 21*a* and 21*b* according to the first embodiment in FIG. 4 and in FIG. 5 are different from each other in the value of $\omega_0$. The feedforward compensation of the servo control device according to the comparative example in FIG. 4 is the same as that in FIG. 5.

The feedforward compensation performed by the feedforward compensation units 21*a* and 21*b* according to the first embodiment makes $g_2$, which is the second-order expansion coefficient of power series expansion of the gain $G(\omega)$ about the frequency, zero, so that a frequency band in which the gain can be deemed to be constant is widened as compared to that of the feedforward compensation of the servo control device according to the comparative example in FIG. 4. Therefore, attenuation in amplitude is minimized, thereby making it possible to reduce an inward turning error on a trajectory of an arc, a corner portion, or the like.

In FIG. 5, $\omega_0$ is set such that the gain in a high-frequency region of the feedforward compensation performed by the feedforward compensation units 21*a* and 21*b* according to the first embodiment is smaller than that in a high-frequency region of the feedforward compensation of the servo control device according to the comparative example. In the case of FIG. 5 as well, a frequency band in which the gain can be deemed to be constant is wider in the servo control device 100 according to the first embodiment than that in the servo control device according to the comparative example. Therefore, according to the servo control device 100 according to the first embodiment, it is possible that trajectory accuracy is improved and a trajectory error between a response trajectory and a reference trajectory is effectively reduced, and at the same time, that vibration suppression performance is improved by making the gain in a high-frequency region smaller, as compared with the servo control device according to the comparative example.

In addition, the second-order to the eighth-order expansion coefficients of power series expansion of the phase delay $PD(\omega)$ are all made to be zero, thereby making it possible to keep the delay time between an input and an output of the feedforward compensation being substantially constant in a frequency range in which $(\omega/\omega_0)\ll 1$ is satisfied. By doing so, distortion of a waveform caused by mismatch in delay time between an input and an output of the feedforward compensation for each frequency component is minimized, thereby making it possible to restrain occurrence of the trajectory error. Note that, if $g_2$ that is the second-order expansion coefficient of power series expansion of the gain $G(\omega)$ about frequency is zero, the aforementioned advantageous effects are produced only by making the second-order expansion coefficient of power series expansion of the phase delay $PD(\omega)$ or the group delay $GD(\omega)$ about frequency be zero.

Formula (12), which is the transfer function of feedforward compensation of the servo control device in the comparative example, is stable and has no unstable zero, and so represents a system based on a minimum phase system. In a case where the system is a minimum phase system, it is known that a frequency response in phase is uniquely determined from a frequency response in gain, and therefore a problem has lain in that the gain and the phase cannot be designed independently in principle (reference: Sugie, Fujita, Introduction to Feedback Control, CORONA PUBLISHING, CO., LTD., p. 99). In this situation, although filters that make the expansion coefficients of power series expansion of either one of the gain and the phase delay be zero have been known as a Butterworth filter and a Bessel filter, respectively, a filter that makes the expansion coefficients of power series expansion of both of the gain and the phase delay be zero at the same time has not been known.

In contrast, in the servo control device 100 according to the first embodiment, the transfer function of the feedforward compensation units 21*a* and 21*b* is made to have unstable zeros so that the system is a non-minimum-phase system, thereby making it possible to design both of the gain characteristics and the phase characteristics of the feedforward compensation units 21a and 21b independently. The inventor of the present invention has then found that feedforward compensation that improves the trajectory accuracy and vibration suppression performance as described above at the same time can be achieved by enabling the gain characteristics and the phase characteristics of the feedforward compensation units 21a and 21b to be designed independently, and then designing low-order expansion coefficients of the second or higher orders of power series expansion of both of the gain $G(\omega)$ and the phase delay $PD(\omega)$ about $(\omega/\omega_0)$ to be zero at the same time.

Figure 6:
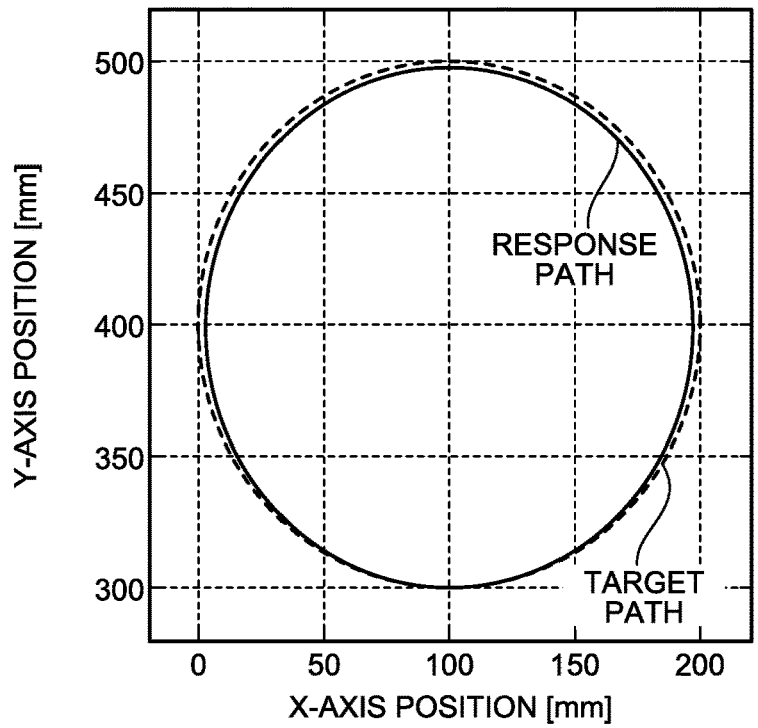
FIG. 6 is a graph illustrating a result of simulation in which a servo control device according to a comparative example made an end effector of a horizontal articulated robot draw a circular trajectory.
Figure 7:
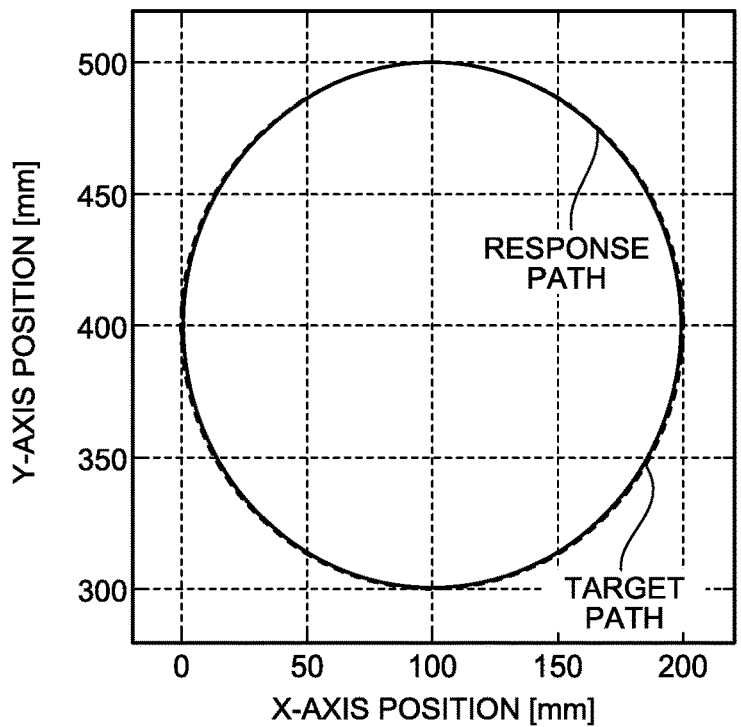
FIG. 7 is a graph illustrating a result of simulation in which the servo control device according to the first embodiment made an end effector of a horizontal articulated robot draw a circular trajectory.

FIG. 6 is a graph illustrating a result of simulation in which the servo control device according to a comparative example made the end effector 16 of the horizontal articulated robot 1 draw a circular trajectory. FIG. 7 is a graph illustrating a result of simulation in which the servo control device 100 according to the first embodiment made the end effector 16 of the horizontal articulated robot 1 draw a circular trajectory. In FIGS. 6 and 7, the horizontal axis represents X-axis position, and the vertical axis represents Y-axis position.

As illustrated in FIG. 6, in the case where the servo control device according to the comparative example made the end effector 16 of the horizontal articulated robot 1 draw a circular trajectory, an inward turning error occurred. In contrast, in the case where the servo control device 100 according to the first embodiment made the end effector 16 of the horizontal articulated robot 1 draw a circular trajectory, almost no trajectory error occurs in a frequency band in which $(\omega/\omega_0) \ll 1$ is satisfied, so that a trajectory error such as an inward turning error is reduced significantly as compared with the servo control device of the comparative example, as illustrated in FIG. 7.

As described above, the servo control device 100 according to the first embodiment makes the transfer function represented in a continuous-time system for the feedforward compensation units 21a and 21b have unstable zeros, thereby making it possible to design both of the gain characteristics and the phase characteristics in their respective independent manners. Furthermore, in the servo control device 100 according to the first embodiment, the feedforward characteristics setting unit 4 sets the transfer function for the feedforward compensation units 21a and 21b so that low-order expansion coefficients of the second or higher order of power series expansion of both of the gain $G(\omega)$ and the phase delay $PD(\omega)$ of the transfer function of the feedforward compensation units 21a and 21b about frequency are zero at the same time, thereby making it possible to achieve both of minimization in trajectory error and minimization in vibration. Thus, in trajectory control of a machine to be controlled, such as a robot arm that performs works such as machining, assembly, sealing, or welding that requires high trajectory accuracy, it is possible to effectively reduce a trajectory error between a response trajectory and a reference trajectory of a point of operation of the machine while minimizing vibration occurring in the machine.

While the servo control device 100 according to the first embodiment has been described above using the horizontal articulated robot 1 as an object to be controlled, the servo control device 100 according to the first embodiment can be applied regardless of the number of drive axes or the kinematics of a machine, and is therefore also applicable to other industrial robots including a vertical articulated robot and a parallel link robot, machine tools, laser processing machines, or the like.

Second Embodiment

Figure 8:
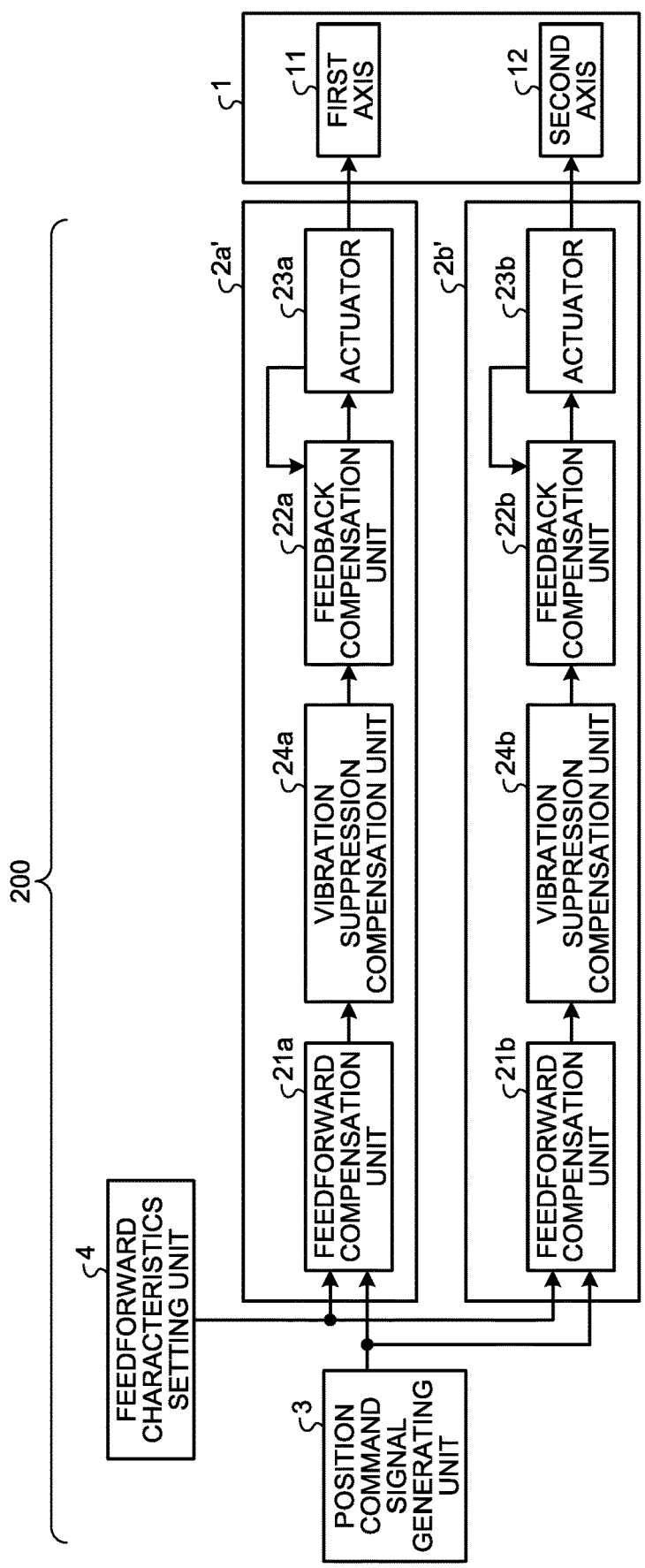
FIG. 8 is a block diagram illustrating a schematic configuration of a servo control device according to a second embodiment of the present invention.

FIG. 8 is a block diagram illustrating a schematic configuration of a servo control device 200 according to a second embodiment of the present invention. The servo control device 200 includes a first axis servo control unit 2a', a second axis servo control unit 2b', a position command signal generating unit 3, and a feedforward characteristics setting unit 4. The first axis servo control unit 2a' and the second axis servo control unit 2b' drive and control the horizontal articulated robot 1.

The differences between the servo control device 200 according to the second embodiment and the servo control device 100 according to the first embodiment lie in the differences between the first axis servo control unit 2a' and the second axis servo control unit 2b', and the first axis servo control unit 2a and the second axis servo control unit 2b. Specifically, the first axis servo control unit 2a' additionally includes a vibration suppression compensation unit 24a between the feedforward compensation unit 21a and the feedback compensation unit 22a, and the second axis servo control unit 2b' additionally includes a vibration suppression compensation unit 24b between the feedforward compensation unit 21b and the feedback compensation unit 22b. The functions of the components of the servo control device 200 represented by the same reference symbols as those in FIG. 1 other than the vibration suppression compensation units 24a and 24b are equivalent to those described in the first embodiment and so the description thereof will be omitted, and the differences of the servo control device 200 from the servo control device 100 will be described below.

In the first axis servo control unit 2a', the vibration suppression compensation unit 24a performs vibration suppression compensation based on the mechanical resonance characteristics of the horizontal articulated robot 1 on feedforward signals outputted by the feedforward compensation unit 21a to thereby obtain feedforward signals subjected to the vibration suppression compensation. The vibration suppression compensation unit 24a outputs the feedforward signals subjected to the vibration suppression compensation to the feedback compensation unit 22a. Specifically, the vibration suppression compensation unit 24a performs the vibration suppression compensation on each of a position feedforward signal, a velocity feedforward signal, and a torque feedforward signal outputted from the feedforward compensation unit 21a to obtain feedforward signals subjected to the vibration suppression compensation, which consist of a position feedforward signal subjected to the vibration suppression compensation, a velocity feedforward signal subjected to the vibration suppression compensation, and a torque feedforward signal subjected to the vibration suppression compensation, and outputs the feedforward signals subjected to the vibration suppression compensation to the feedback compensation unit 22a. The feedback compensation unit 22a performs feedback compensation on the basis of the feedforward signals subjected to the vibration suppression compensation inputted from the vibration suppression compensation unit 24a and a feedback signal inputted from the actuator 23a to obtain a torque command signal, and outputs the torque command signal to the actuator 23a. The position and the velocity of the actuator 23a are controlled on the basis of the torque command signal inputted from the feedback compensation unit 22a.

The second axis servo control unit 2b' and the vibration suppression compensation unit 24b also function in a manner similar to the above.

In driving a controlled object having mechanical resonance, there has been known a method of applying correction computation based on a transfer function expressed by the following formula (13) to the feedforward signals so as to lower a power at a resonance frequency in the operation of the controlled object included in a reference trajectory (reference: Japanese Patent Application Laid-open No. 2001-249702). Such correction computation for lowering the power at a resonance frequency based on mechanical resonance characteristics is referred to as vibration suppression compensation. Note that vibration frequency $\omega_z$ represents the frequency of vibration to be suppressed, attenuation coefficient $\zeta_z$ represents a damping ratio, and s represents a Laplace operator.

[Formula 13]

$$V(s) = 1 + \frac{2\zeta_z}{\omega_z}s + \frac{1}{\omega_z^2}s^2 \quad (13)$$

The correction computation based on the transfer function expressed by formula (13) is an example of the vibration suppression compensation. The correction computation based on the transfer function expressed by formula (13) has an effect of attenuating the gain by feedforward compensation at the vibration frequency $\omega_z$, but the correction computation uses a square of the Laplace operator s, that is, a second-order differential of an input signal, and thereby has unintended characteristics of amplifying the gain by feedforward compensation in a frequency region of the vibration frequency $\omega_z$ or higher. For that reason, a high-frequency component contained in the feedforward signal may be amplified depending on the relation between the vibration frequency $\omega_z$ and the attenuation characteristics of the feedforward compensation, thereby possibly leading to overmuch of an electric current value of the actuator or involvement of unnecessary high-frequency vibration in the operation of the actuator.

On the other hand, the feedforward compensation performed by the feedforward compensation units 21a and 21b of the servo control device 200 according to the second embodiment also has an effect of reducing the gain in the high-frequency region in addition to improving trajectory accuracy as compared with the servo control device according to the comparative example as described in the first embodiment. The servo control device 200, therefore, can alleviate the problem of overmuch of a current value of the actuator or involvement of unnecessary high-frequency vibration in the operation of the actuator caused by vibration suppression compensation as described above.

Figure 9:
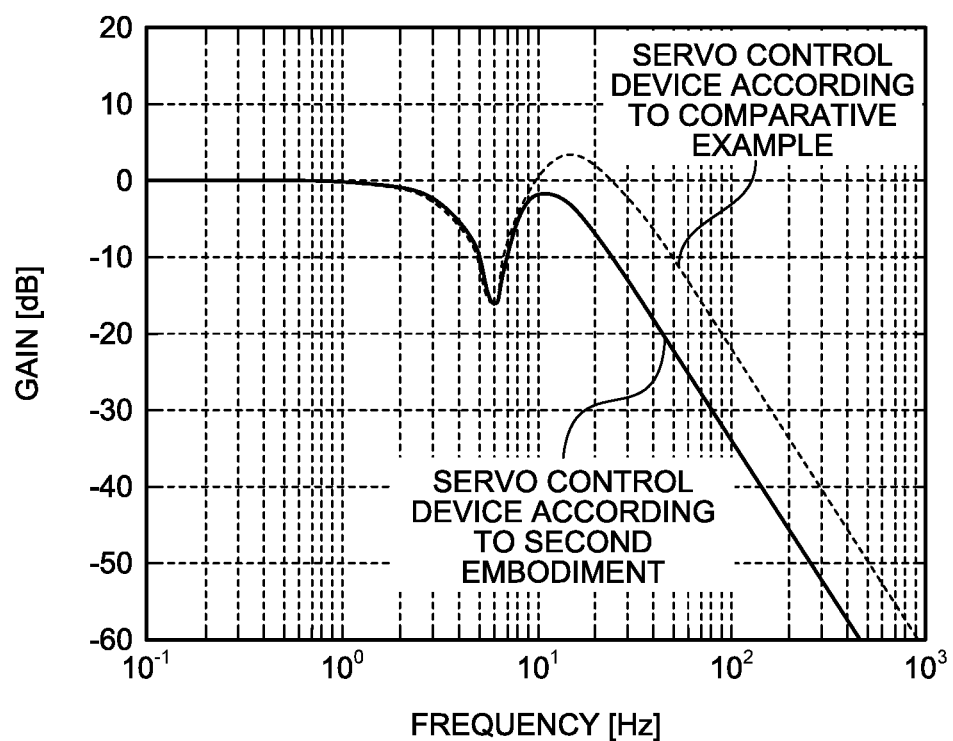
FIG. 9 is a graph illustrating examples of frequency responses of gain of transfer functions from a position command signal to a position feedforward signal having been subjected to vibration suppression compensation in the servo control devices according to the second embodiment and the comparative example.

FIG. 9 is a graph illustrating examples of frequency responses of the gains of transfer functions from a position command signal to a position feedforward signal subjected to vibration suppression compensation in the servo control devices according to the second embodiment and the comparative example. FIG. 9 illustrates the frequency responses of the gain from a position command signal to a position feedforward signal subjected to vibration suppression compensation in a case where vibration suppression compensation is performed on the feedforward compensation illustrated in FIG. 5 with the vibration frequency $\omega_z$=6 Hz and the attenuation coefficient $\zeta_z$=0.1 in formula (13). Specifically, the frequency response of the gain in the servo control device 200 according to the second embodiment illustrated by a solid line is a frequency response of the gain in a case where the vibration suppression compensation is performed on the feedforward compensation according to the first embodiment in FIG. 5, and the frequency response of the gain in the servo control device according to the comparative example illustrated by a broken line is a frequency response of the gain in a case where the vibration suppression compensation is performed on the feedforward compensation according to the comparative example in FIG. 5. As illustrated in FIG. 9, according to the servo control device 200 of the second embodiment, the amplification of high-frequency gain that is a problem when the vibration suppression compensation is performed can be restrained as compared with the servo control device according to the comparative example, so that a response smoother than that of the servo control device according to the comparative example can be achieved.

As described above, according to the servo control device 200 of the second embodiment, it is possible to effectively reduce a trajectory error between a response trajectory and a reference trajectory of a point of operation of a machine to be controlled, while minimizing mechanical vibration occurring in the controlled machine to achieve a smooth response.

Third Embodiment

Figure 10:
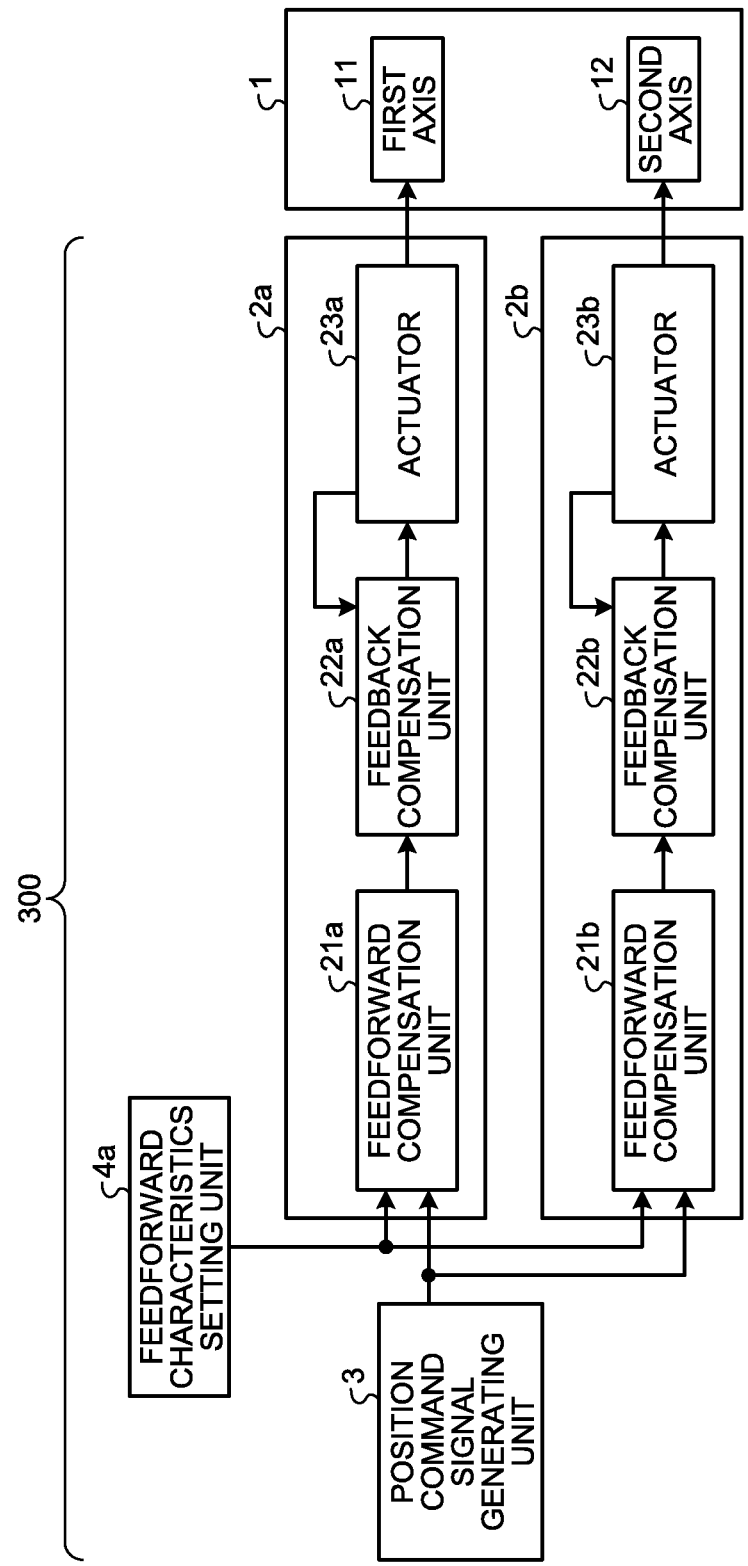
FIG. 10 is a block diagram illustrating a schematic configuration of a servo control device according to a third embodiment of the present invention.

FIG. 10 is a block diagram illustrating a schematic configuration of a servo control device 300 according to a third embodiment of the present invention. The servo control device 300 includes a first axis servo control unit 2a, a second axis servo control unit 2b, a position command signal generating unit 3, and a feedforward characteristics setting unit 4a. The first axis servo control unit 2a and the second axis servo control unit 2b drive and control the horizontal articulated robot 1.

The differences between the servo control device 300 according to the third embodiment and the servo control device 100 according to the first embodiment lie in the differences between the feedforward characteristics setting unit 4a and the feedforward characteristics setting unit 4. The transfer function set for each of the feedforward compensation units 21a and 21b by the feedforward characteristics setting unit 4a and the transfer function set by the feedforward characteristics setting unit 4 both have unstable zeros but are different from each other. The functions of the components of the servo control device 300 represented by the same reference signs as those in FIG. 1 other than the feedforward characteristics setting unit 4a are equivalent to those described in the first embodiment, and so the description thereof is omitted. The differences of the servo control device 300 from the servo control device 100 will be described below.

A transfer function in which the order of the numerator polynomial is a second order and that of the denominator polynomial is a seventh order is expressed by the following formula (14) as an example of the transfer function represented in a continuous-time system, having unstable zeros set in the feedforward compensation unit 21a and the feedforward compensation unit 21b by the feedforward characteristics setting unit 4a.

[Formula 14]

$$F(s) = \frac{1 - b_1\left(\frac{s}{\omega_0}\right) + b_2\left(\frac{s}{\omega_0}\right)^2}{1 + a_2\left(\frac{s}{\omega_0}\right) + a_2\left(\frac{s}{\omega_0}\right)^2 + a_3\left(\frac{s}{\omega_0}\right)^3 + a_4\left(\frac{s}{\omega_0}\right)^4 + a_5\left(\frac{s}{\omega_0}\right)^5 + a_6\left(\frac{s}{\omega_0}\right)^6 + \left(\frac{s}{\omega_0}\right)^7} \quad (14)$$

When $\omega_0$, $b_1$, and $b_2$ are positive real numbers, the zeros that are a solution of the numerator polynomial are a pair of two positive real numbers or conjugate complex numbers with positive real parts, and because the transfer function expressed by formula (14) has two unstable zeros, the system represented by this transfer function is a non-minimum-phase system.

The feedforward characteristics setting unit 4a calculates the gain $G(\omega)$ and the phase delay $PD(\omega)$ at the angular frequency $\omega$ of the transfer function of formula (14) on the basis of the following formula (15) and formula (16), respectively.

[Formula 15]

$$G(\omega) = \sqrt{\frac{\left(1 - b_2\left(\frac{\omega}{\omega_0}\right)^2\right)^2 + \left(b_1\left(\frac{\omega}{\omega_0}\right)\right)^2}{\left(1 - a_2\left(\frac{\omega}{\omega_0}\right)^2 + a_4\left(\frac{\omega}{\omega_0}\right)^4 - a_6\left(\frac{\omega}{\omega_0}\right)^6\right)^2 + \left(a_1\left(\frac{\omega}{\omega_0}\right) - a_3\left(\frac{\omega}{\omega_0}\right)^3 + a_5\left(\frac{\omega}{\omega_0}\right)^5 - \left(\frac{\omega}{\omega_0}\right)^7\right)^2}} \quad (15)$$

[Formula 16]

$$PD(\omega) = \frac{1}{\omega}\left[\arctan\left(\frac{b_1\left(\frac{\omega}{\omega_0}\right)}{1 - b_2\left(\frac{\omega}{\omega_0}\right)^2}\right) + \arctan\left(\frac{a_1\left(\frac{\omega}{\omega_0}\right) - a_3\left(\frac{\omega}{\omega_0}\right)^3 + a_5\left(\frac{\omega}{\omega_0}\right)^5 - \left(\frac{\omega}{\omega_0}\right)^7}{1 - a_2\left(\frac{\omega}{\omega_0}\right)^2 + a_4\left(\frac{\omega}{\omega_0}\right)^4 - a_6\left(\frac{\omega}{\omega_0}\right)^6}\right)\right] \quad (16)$$

The feedforward characteristics setting unit 4a further performs power series expansion of the gain $G(\omega)$ and the phase delay $PD(\omega)$ about the angular frequency $\omega$ as in the following formula (17) and formula (18). Note that the last term of the right side of formula (17) represents a term in which the order of $(\omega/\omega_0)$ is a sixth or higher order, and the last term of the right side of formula (18) represents a term in which the order of $(\omega/\omega_0)$ is a fourteenth or higher order.

[Formula 17]

$$G(\omega) = 1 + \left(\sum_{i \in \{2,4\}} g_i\left(\frac{\omega}{\omega_0}\right)^i\right) + O\left(\left(\frac{\omega}{\omega_0}\right)^6\right) \quad (17)$$

[Formula 18]

$$PD(\omega) = \frac{a_1 + b_1}{\omega_0} + \frac{1}{\omega_0}\left(\sum_{i \in \{2,4,6,8,10,12\}} pd_i\left(\frac{\omega}{\omega_0}\right)^i\right) + O\left(\left(\frac{\omega}{\omega_0}\right)^{14}\right) \quad (18)$$

Here, $g_2$ and $g_4$, which are second- and fourth-order expansion coefficients of $(\omega/\omega_0)$ of the gain $G(\omega)$ expressed by formula (17), and $pd_2$, $pd_4$, $pd_6$, $pd_8$, $pd_{10}$, and $pd_{12}$, which are second- to twelfth-order expansion coefficients of $(\omega/\omega_0)$ of the phase delay $PD(\omega)$ expressed by formula (18) are obtained in advance as functions of $a_1$, $a_2$, $a_3$, $a_4$, $a_5$, $a_6$, $b_1$, and $b_2$ that are parameters of the transfer function of formula (14), respectively. In addition, the feedforward characteristics setting unit 4a obtains in advance the values of $a_1$, $a_2$, $a_3$, $a_4$, $a_5$, $a_6$, $b_1$, and $b_2$ such that $g_2$, $g_4$, $pd_2$, $pd_4$, $pd_6$, $pd_8$, $pd_{10}$, and $pd_{12}$ are all zero. This problem can be formulated as a simultaneous equation expressed by the following formula (19) constituted by polynomials using $a_1$, $a_2$, $a_3$, $a_4$, $a_5$, $a_6$, $b_1$, and $b_2$ as variables.

[Formula 19]

$$\begin{bmatrix} g_2(a_1, a_2, a_3, a_4, a_5, a_6, b_1, b_2) \\ g_4(a_1, a_2, a_3, a_4, a_5, a_6, b_1, b_2) \\ pd_2(a_1, a_2, a_3, a_4, a_5, a_6, b_1, b_2) \\ pd_4(a_1, a_2, a_3, a_4, a_5, a_6, b_1, b_2) \\ pd_6(a_1, a_2, a_3, a_4, a_5, a_6, b_1, b_2) \\ pd_8(a_1, a_2, a_3, a_4, a_5, a_6, b_1, b_2) \\ pd_{10}(a_1, a_2, a_3, a_4, a_5, a_6, b_1, b_2) \\ pd_{12}(a_1, a_2, a_3, a_4, a_5, a_6, b_1, b_2) \end{bmatrix} = \begin{bmatrix} 0 \\ 0 \\ 0 \\ 0 \\ 0 \\ 0 \\ 0 \\ 0 \end{bmatrix} \quad (19)$$

Because it is sufficient that the simultaneous equation expressed by formula (19) be solved once, the simultaneous equation may be solved offline outside the servo control device 300 to obtain the values of $a_1$, $a_2$, $a_3$, $a_4$, $a_5$, $a_6$, $b_1$, and $b_2$ as a solution, and the feedforward characteristics setting unit 4a may store the solution in advance.

The feedforward characteristics setting unit 4a sets the filter characteristics of the feedforward compensation units 21a and 21b by determining the values of $a_1$, $a_2$, $a_3$, $a_4$, $a_5$, $a_6$, $b_1$, and $b_2$ obtained as described above and a predetermined $\omega_0$ as parameters of the transfer function of formula (14).

Note that, in a manner similar to that described in the first embodiment, power series expansion of the group delay GD ($\omega$) instead of the phase delay PD ($\omega$) may be calculated, and the parameters of the transfer function of formula (14) may be determined so that all of second- and fourth-order expansion coefficients of the gain $G(\omega)$ about $(\omega/\omega_0)$ and second-, fourth-, sixth-, eighth-, tenth-, and twelfth-order expansion coefficients of the group delay GD ($\omega$) about $(\omega/\omega_0)$ are zero.

Figure 11:
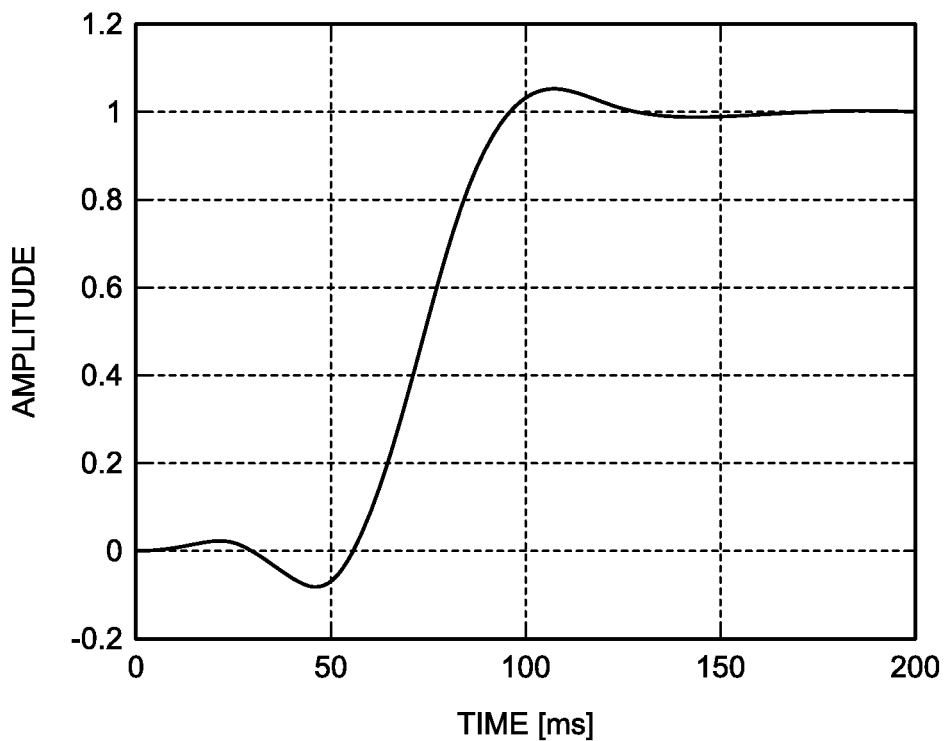
FIG. 11 is a graph illustrating a step response of a transfer function of a feedforward compensation unit according to the third embodiment.

FIG. 11 is a graph illustrating a step response of a transfer function of the feedforward compensation units 21a and 21b according to the third embodiment. In other words, FIG. 11 illustrates a step response of a transfer function of a system that outputs a position feedforward signal on the basis of a position command signal. In FIG. 11, the horizontal axis represents time, and the vertical axis represents amplitude. Because the transfer function has unstable zeros, the step response of the feedforward compensation units 21a and 21b according to the third embodiment has an initial undershoot as illustrated in FIG. 11.

In the servo control device 300 according to the third embodiment, $g_2$ and $g_4$, which are second- and fourth-order expansion coefficients of power series expansion of the gain $G(\omega)$, and $pd_2$, $pd_4$, $pd_6$, $pd_8$, $pd_{10}$, and $pd_{12}$, which are second- to twelfth-order expansion coefficients of power series expansion of the phase delay $PD(\omega)$, are all made to be zero. By so doing, the gain $G(\omega)$ and phase delay $PD(\omega)$ of the transfer function of formula (14) are expressed by the following formula (20).

[Formula 20]

$$\begin{cases} G(\omega) + 1 + O\left(\left(\frac{\omega}{\omega_0}\right)^6\right) \\ PD(\omega) = \frac{a_1 + b_1}{\omega_0} + O\left(\left(\frac{\omega}{\omega_0}\right)^{14}\right) \end{cases} \quad (20)$$

Therefore, as with the first embodiment, the feedforward compensation units 21a and 21b according to the third embodiment can also be deemed to be dead time components with a delay time of $(a_1+b_1)/\omega_0$ in a frequency range in which $(\omega/\omega_0) \ll 1$ is satisfied. Furthermore, because the order of an error from the dead time component is smaller with formula (20) as compared with formula (9) in the first embodiment, the servo control device 300 according to the third embodiment further reduces a trajectory error occurring in a frequency range in which $(\omega/\omega_0)\ll 1$ is satisfied than the servo control device 100 according to the first embodiment.

On the other hand, in a frequency range in which $(\omega/\omega_0)\gg 1$ is satisfied, terms other than a term in which the order of $(\omega/\omega_0)$ is the highest order are negligible, and so the gain $G(\omega)$ of the transfer function of formula (14) is expressed by the following formula (21).

[Formula 21]

$$G(\omega) \simeq \frac{b_2}{\left(\dfrac{\omega}{\omega_0}\right)^5} \quad (21)$$

The order of the denominator of the gain $G(\omega)$ expressed by formula (21) is a fifth order. Therefore, because the gain $G(\omega)$ of the feedforward compensation units 21a and 21b according to the third embodiment is attenuated at −100 dB/dec, the attenuation performance of the gain in a high-frequency region is further improved than that of the servo control device 100 according to the first embodiment.

Figure 12:
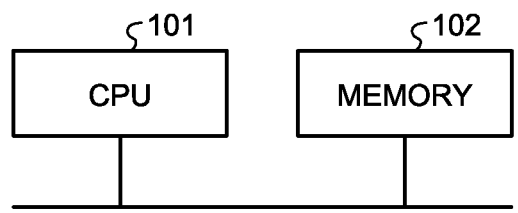
FIG. 12 is a diagram illustrating a hardware configuration of a computer system according to the first to third embodiments.

The components of the servo control devices 100, 200, and 300 according to the first to third embodiments other than the actuators 23a and 23b can be implemented by a computer system. FIG. 12 is a diagram illustrating a hardware configuration of a computer system according to the first to third embodiments. Specifically, the feedforward compensation units 21a and 21b, the feedback compensation units 22a and 22b, the vibration suppression compensation units 24a and 24b, the position command signal generating unit 3, and the feedforward characteristics setting units 4 and 4a according to the first to third embodiments can each be implemented by a computer system as illustrated in FIG. 12. In this case, each or a set of some of the functions of the feedforward compensation units 21a and 21b, the feedback compensation units 22a and 22b, the vibration suppression compensation units 24a and 24b, the position command signal generating unit 3, and the feedforward characteristics setting units 4 and 4a is implemented by a CPU 101 and a memory 102. The functions of the feedforward compensation units 21a and 21b, the feedback compensation units 22a and 22b, the vibration suppression compensation units 24a and 24b, the position command signal generating unit 3, and the feedforward characteristics setting units 4 and 4a are implemented by software, firmware, or combination of software and firmware. The software or firmware is described in the form of programs and stored in the memory 102. The CPU 101 implements the functions of the components by reading and executing the programs stored in the memory 102. Specifically, the computer system includes the memory 102 for storing programs including steps for performing operations realizing the functions of the feedforward compensation units 21a and 21b, the feedback compensation units 22a and 22b, the vibration suppression compensation units 24a and 24b, the position command signal generating unit 3, and the feedforward characteristics setting units 4 and 4a. In other words, these programs cause a computer to execute the procedures or the methods for the feedforward compensation units 21a and 21b, the feedback compensation units 22a and 22b, the vibration suppression compensation units 24a and 24b, the position command signal generating unit 3, and the feedforward characteristics setting units 4 and 4a. Note that the memory 102 corresponds to a nonvolatile or volatile semiconductor memory, such as a random access memory (RAM), a read only memory (ROM), a flash memory, an erasable programmable read only memory (EPROM), or an electrically erasable programmable read only memory (EEPROM) (registered trademark); a magnetic disk; a flexible disk; an optical disk, a compact disc; a mini disc; or a digital versatile disk (DVD).

Figure 13:
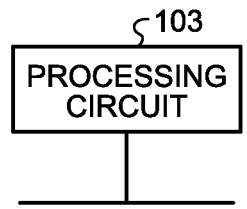
FIG. 13 is a diagram illustrating a configuration in a case where the functions of a feedforward compensation unit, a feedback compensation unit, a vibration suppression compensation unit, a position command signal generating unit, and a feedforward characteristics setting unit according to the first to third embodiments are implemented by dedicated hardware.

FIG. 13 is a diagram illustrating a configuration of dedicated hardware for implementing the functions of the feedforward compensation units 21a and 21b, the feedback compensation units 22a and 22b, the vibration suppression compensation units 24a and 24b, the position command signal generating unit 3, and the feedforward characteristics setting units 4 and 4a according to the first to third embodiments. As illustrated in FIG. 13, each of the feedforward compensation units 21a and 21b, the feedback compensation units 22a and 22b, the vibration suppression compensation units 24a and 24b, the position command signal generating unit 3, and the feedforward characteristics setting units 4 and 4a may be configured using a processing circuit 103 that is a dedicated hardware set. The processing circuit 103 corresponds to a single circuit, a composite circuit, a programmed processor, a parallel-programmed processor, an application specific integrated circuit (ASIC), a field programmable gate array (FPGA), or any combination thereof. The functions of the feedforward compensation units 21a and 21b, the feedback compensation units 22a and 22b, the vibration suppression compensation units 24a and 24b, the position command signal generating unit 3, and the feedforward characteristics setting units 4 and 4a may be implemented by their respective different processing circuits 103, or the functions of the units may be collectively implemented by one processing circuit 103 as a whole.

Alternatively, some of the functions of the feedforward compensation units 21a and 21b, the feedback compensation units 22a and 22b, the vibration suppression compensation units 24a and 24b, the position command signal generating unit 3, and the feedforward characteristics setting units 4 and 4a may be implemented by dedicated hardware and the remained others thereof may be implemented by software or firmware. In this way, the above-described functions of the feedforward compensation units 21a and 21b, the feedback compensation units 22a and 22b, the vibration suppression compensation units 24a and 24b, the position command signal generating unit 3, and the feedforward characteristics setting units 4 and 4a can be implemented by hardware, software, firmware, or any combination thereof.

As described above, the servo control devices 100, 200, and 300 according to the first to third embodiments are capable of freely adjusting the trajectory accuracy in a frequency range in which $(\omega)/\omega_0\ll 1$ is satisfied and the gain attenuation performance in a frequency range in which $(w/\omega_0)\gg 1$ is satisfied by adjusting the orders and the number of unstable zeros of the transfer function of the feedforward compensation units 21a and 21b. Accordingly, in trajectory control of a controlled machine such as a robot arm that performs works for which high trajectory accuracy is required, a trajectory error between a response trajectory and a reference trajectory of a point of operation of the machine can be effectively reduced while machine vibration occurring in the machine is minimized.

The configurations presented in the embodiments above are examples of the present invention, and can be combined with other publicly known techniques and partly omitted and/or modified without departing from the scope of the present invention.

REFERENCE SIGNS LIST 1 horizontal articulated robot; 2a, 2a' first axis servo control unit; 2b, 2b' second axis servo control unit; 3 position command signal generating unit; 4, 4a feedforward characteristics setting unit; 11 first axis; second axis; 13 base; 14 first arm; 15 second arm; end effector; 21a, 21b feedforward compensation unit; 22a, 22b feedback compensation unit; 23a, 23b actuator; 24a, 24b vibration suppression compensation unit; 100, 200, 300 servo control device; 101 CPU; 102 memory; 103 processing circuit.

The invention claimed is:

1. A servo control device for controlling an end effector of a machine to follow a set reference trajectory by driving the machine using an actuator, the servo control device comprising:
  feedforward compensation circuitry configured to perform feedforward compensation by outputting a feedforward signal for controlling the actuator based on a position command signal inputted therein, wherein
  input-output characteristics represented in a continuous-time system of the feedforward compensation circuitry are expressed by a transfer function having unstable zeros, and a step response of the feedforward compensation circuitry has an initial undershoot,
  each of the unstable zeros refers to a zero with a positive real part, and
  the initial undershoot refers to a situation in which the step response has a value with a sign opposite to that of a steady-state value before the step response reaches the steady-state value.

2. The servo control device according to claim 1, wherein the transfer function has
  a second-order expansion coefficient of power series expansion of gain of the transfer function about frequency that is zero, and
  a second-order expansion coefficient of power series expansion of a phase delay or a group delay of the transfer function about frequency that is zero.

3. The servo control device according to claim 1, wherein the transfer function has
  a second-order expansion coefficient of power series expansion of gain of the transfer function about frequency that is zero, and
  second-, fourth-, sixth-, and eighth-order expansion coefficients of power series expansion of a phase delay or a group delay of the transfer function about frequency that are zero.

4. The servo control device according to claim 1, wherein the transfer function has
  second- and fourth-order expansion coefficients of power series expansion of the gain of the transfer function about frequency that are also zero, and
  second-, fourth-, sixth-, eighth-, tenth-, and twelfth-order expansion coefficients of power series expansion of a phase delay or a group delay of the transfer function about frequency that are zero.

5. The servo control device according to claim 1, comprising:
  vibration suppression compensation circuitry that is configured to receive the feedforward signal from the feedforward compensation circuitry and perform vibration suppression compensation based on mechanical resonance characteristics of the machine on the feedforward signal to thereby obtain a compensated feedforward signal subjected to the vibration suppression compensation, wherein
  the actuator is controlled based on the compensated feedforward signal subjected to the vibration suppression compensation.

6. The servo control device according to claim 2, comprising:
  vibration suppression compensation circuitry that is configured to receive the feedforward signal from the feedforward compensation circuitry and perform vibration suppression compensation based on mechanical resonance characteristics of the machine on the feedforward signal to thereby obtain a compensated feedforward signal subjected to the vibration suppression compensation, wherein
  the actuator is controlled based on the compensated feedforward signal subjected to the vibration suppression compensation.

7. The servo control device according to claim 3, comprising:
  vibration suppression compensation circuitry that is configured to receive the feedforward signal from the feedforward compensation circuitry and perform vibration suppression compensation based on mechanical resonance characteristics of the machine on the feedforward signal to thereby obtain a compensated feedforward signal subjected to the vibration suppression compensation, wherein
  the actuator is controlled based on the compensated feedforward signal subjected to the vibration suppression compensation.

8. The servo control device according to claim 4, comprising:
  vibration suppression compensation circuitry that is configured to receive the feedforward signal from the feedforward compensation circuitry and perform vibration suppression compensation based on mechanical resonance characteristics of the machine on the feedforward signal to thereby obtain a compensated feedforward signal subjected to the vibration suppression compensation, wherein
  the actuator is controlled based on the compensated feedforward signal subjected to the vibration suppression compensation.

* * * * *